United States Patent
Mueller

(10) Patent No.: US 8,634,498 B2
(45) Date of Patent: Jan. 21, 2014

(54) SYSTEMS AND METHODS FOR PROBING WIRED COMMUNICATION CHANNELS

(75) Inventor: Arndt Mueller, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 674 days.

(21) Appl. No.: 12/336,975

(22) Filed: Dec. 17, 2008

(65) Prior Publication Data

US 2010/0150216 A1   Jun. 17, 2010

(51) Int. Cl.
*H03K 9/00* (2006.01)

(52) U.S. Cl.
USPC . 375/316; 375/224; 365/185.03; 379/399.01; 379/403; 379/404; 379/412

(58) Field of Classification Search
USPC .......................................................... 375/224
See application file for complete search history.

(56) References Cited

U.S. PATENT DOCUMENTS

| | | | |
|---|---|---|---|
| 5,050,189 A * | 9/1991 | Cox et al. | 375/223 |
| 6,084,905 A * | 7/2000 | Ishifuji et al. | 375/133 |
| 6,341,214 B2 * | 1/2002 | Uesugi | 455/69 |
| 6,694,014 B1 * | 2/2004 | Knollman | 379/399.01 |
| 6,898,198 B1 * | 5/2005 | Ryan et al. | 370/338 |
| 6,909,757 B2 * | 6/2005 | Justice et al. | 375/297 |
| 7,012,883 B2 | 3/2006 | Jalali et al. | |
| 7,764,727 B2 * | 7/2010 | Ye et al. | 375/150 |
| 2007/0070691 A1 * | 3/2007 | Walvis et al. | 365/185.03 |
| 2008/0069253 A1 | 3/2008 | Tzannes | |
| 2008/0266160 A1 | 10/2008 | Goodall et al. | |

\* cited by examiner

*Primary Examiner* — Lihong Yu
(74) *Attorney, Agent, or Firm* — Bruce Greenhaus; Richard Bachand; Sheppard Mullin Richter & Hampton LLP

(57) ABSTRACT

Various systems and methods for probing a communication channel. These systems and methods transmit an error vector probe packet from a first transmitter while a second transmitter is active and transmitting. A network device may receive the error vector probe packet and measure an error vector magnitude based on the received error vector probe packet. Using the error vector magnitude, the network device estimates channel characteristics such as signal-to-noise ratio, data capacity, etc. The transmission can occur when more than one transmitter is active and transmitting. At least some of the other transmitters are active and transmit an analog zero signal, e.g., all digital zeros on the input to the digital-to-analog converter of a network device when an error vector probe packet is transmitted.

23 Claims, 4 Drawing Sheets

SYSTEMS AND METHODS FOR PROBING WIRED COMMUNICATION CHANNELS

TECHNICAL FIELD

This disclosure relates to communication systems, and at least some of the examples disclosed herein relate more specifically to systems and methods for probing a wired communication channel.

DESCRIPTION OF THE RELATED ART

FIG. 1 is a diagram that illustrates an example of a wireless environment. An area 100 includes various transmitting and receiving devices 102, 104 and 106. These devices 102, 104 and 106 can include mobile phones, radio and television transmitters, wireless networking devices, etc. Some of the devices 102, 104 and 106 are mobile devices; some are not mobile. Mobile or not, however, the communication environment in which these devices operate is constantly changing. Signals from these devices 102, 104 and 106 reflect off buildings 108, vehicles 110 and 112, hills 114 and other features of the geographic area 100. Further, features of the area 100 are changing. Vehicles 110 and 112 move, people move within the area 100, weather patterns change, new buildings are built, etc. All of these and many other factors lead to a constantly changing communications environment.

The characteristics of wired communications channels, on the other hand, tend to be more consistent, even though they may vary with temperature, equipment changes, etc. Because of this relative consistency, it can be advantageous to estimate certain channel characteristics in ways not used in a wireless communication system, even if these wired systems use similar modulation techniques.

One example of a wired system is the system defined by the Multimedia over Coax Alliance (MoCA™). In a MoCA system, coaxial cables are used to connect components of the network, such as antennas, TVs, set top boxes and radios, and generally to distribute cable TV signals throughout a home or building. MoCA systems are generally used to allow such entertainment devices within a home network to communicate with one another and share data, including multimedia data, such as television shows, movies, internet data, music, video clips, etc. One advantage of such MoCA systems is that new home wiring might be avoided because many homes already have adequate coaxial wiring installed. MoCA systems are typically used to distribute high-quality multimedia content and high-speed data with throughput exceeding 100 megabit per second.

MoCA devices generally communication with one another in the 1 GHz microwave band using orthogonal frequency-division multiplexing (OFDM) modulation. The OFDM modulated signals used by MoCA are communicated over MoCA channels using a frequency-division multiplexing (FDM). In MoCA systems that use OFDM, each MoCA channel is formed from one of a large number of closely spaced orthogonal sub-carriers. These MoCA channels are typically used to carry data. Each sub-carrier is typically modulated with a conventional modulation scheme at a low symbol rate, maintaining total data rates similar to conventional single-carrier modulation schemes in the same bandwidth. Some example modulations include quadrature amplitude modulation (QAM) or phase shift keying (PSK) modulation.

In order to take advantage of the maximum bandwidth of each channel, it is necessary to characterize the channel between each device and each other device. The characteristics of each channel are determined by transmitting an error vector magnitude (EVM) probe from one device that represents a node in the network to each other device that represents a node on the network. Each such receiving device measures the value of the EVM probe. The measurements are then used to determine the characteristics of the channel between the transmitting device and the receiving device. However, the characteristics of the channel will change depending upon which of the other devices on the network are transmitting at any particular time.

In current MoCA systems, the only device that is transmitting when a channel is being measured is that device that is sending the EVM probes used to measure the characteristics of the channels between the transmitting device and the other devices of the network. But, in Orthogonal Frequency Division Multiple Access (OFDMA) mode, when content is being communicated between the devices of the network, the network will support several devices transmitting at the same time, each on different channels using a different sub-carrier for each channel.

Accordingly, the characteristics measured for each channel will only accurately reflect the actual characteristics of the channel if there is only one device transmitting at a time. This mischaracterization of the channels can lead to inefficiency in the use of the bandwidth of the network. Therefore, there is a need for a method and apparatus for measuring the characteristics of each channel without having to transmit EVM probes under each possible situation in which there is a unique combination of devices transmitting concurrently on other channels.

BRIEF SUMMARY OF EMBODIMENTS OF THE INVENTION

Various embodiments of systems and methods for probing a wired communication channel are presented. Various embodiments of the disclosed method and apparatus are directed toward systems and methods for characterizing a wired communication channel. In various embodiments, these systems and methods transmit an error vector magnitude (EVM) probe packet from a first transmitter while a second transmitter is active and transmitting. A network device, such as a network controller can receive the EVM probe packet and measure an EVM based on the received EVM probe packet. Using the EVM, the network controller or other network device may estimate channel characteristics such as signal-to-noise ratio, data capacity, etc.

In various embodiments, the transmission of an EVM probe packet occurs when more than one transmitter is active and transmitting. In such a case, the additional transmitters are transmitting an analog zero signal, i.e., all digital zeros on the input to the digital-to-analog converter that drives the transmission circuitry in the network device. For a device on a wired network to present the same or similar impedance to the rest of the network as that device presents when the network is carrying user data, the device should be transmitting when an EVM probe packet is transmitted from another network device.

In various embodiments, the estimation of channel characteristics occurs at a network device. For example, the estimation may occur at a network controller. In such an example, one network device transmits a probe packet while other network devices are transmitting a known data sequence. A network controller receives the probe packet and the network controller then determines various channel characteristics, e.g., signal-to-noise ratio, channel capacity, etc.

In various embodiments, the channel characteristic that is estimated is based on the magnitude of the error vector as determined upon receipt of the EVM probe packet. Some example channel characteristics that can be estimated include signal-to-noise ratio, data capacity, etc. Additionally, various methods and systems calculate a power setting based on a previous determination of the magnitude of an error vector, wherein the EVM probe packet is transmitted while a second transmitter is active and transmitting an analog zero signal.

Various embodiments transmit a second EVM probe packet from a second transmitter while a first transmitter is active and transmitting on a wired communication channel, such as a MoCA network. In such embodiments, the EVM probe packet is received and various characteristics are determined. In some of these embodiments, the magnitude of a second error vector for the second transmitter is also measured based on the received second EVM probe packet. The channel characteristics for the second transmitter are estimated based on the magnitude of the second error vector. The second transmitter operates in a configuration used to transmit data packets. In one example in which the channel characteristics for the second transmitter are not estimated, an analog zero signal is transmitted by the second transmitter.

Other features and aspects of the disclosed method and apparatus will become apparent from the following detailed description, taken in conjunction with the accompanying drawings, which illustrate, by way of example, the features in accordance with embodiments. The summary is not intended to limit the scope of the invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict typical or example embodiments of the claimed invention. These drawings are provided to facilitate the reader's understanding of the disclosed method and apparatus and should not be considered limiting of the breadth or scope of the claimed invention. It should be noted that for clarity and ease of illustration these drawings are not necessarily made to scale.

The figures are not intended to be exhaustive or to limit the disclosed method and apparatus to the precise form disclosed. It should be understood that the disclosed method and apparatus can be practiced with modification and alteration. The claimed invention should be defined only by the claims and the equivalents thereof.

DETAILED DESCRIPTION

The disclosed method and apparatus relates to communication systems, and more particularly, various embodiments relate to systems and methods for probing a wired communication channel. While MoCA using OFDM is presented as an example system below, it will be understood by those of skill in the art that other wired communication systems may also use the disclosed method and apparatus. Various embodiments of the disclosed method and apparatus are directed toward characterizing a wired communication channel using an error vector magnitude (EVM) probe packet to measure the magnitude of an error vector (i.e., the EVM). In accordance with various embodiments of the disclosed method and apparatus, the EVM is used to determine various characteristics of the network, such as signal-to-noise ratio, data capacity, etc.

In various embodiments, these systems and methods transmit an EVM probe packet from a first transmitter while a second transmitter is transmitting. The impedance of the second transmitter during the time when the channel is being characterized will be the same or similar to its impedance when operating in the network.

In various embodiments, a network device, such as a network controller, receives an EVM probe packet and measures the EVM based on the received EVM probe packet. The network controller or other network device estimates channel characteristics using the EVM.

Figure 1:
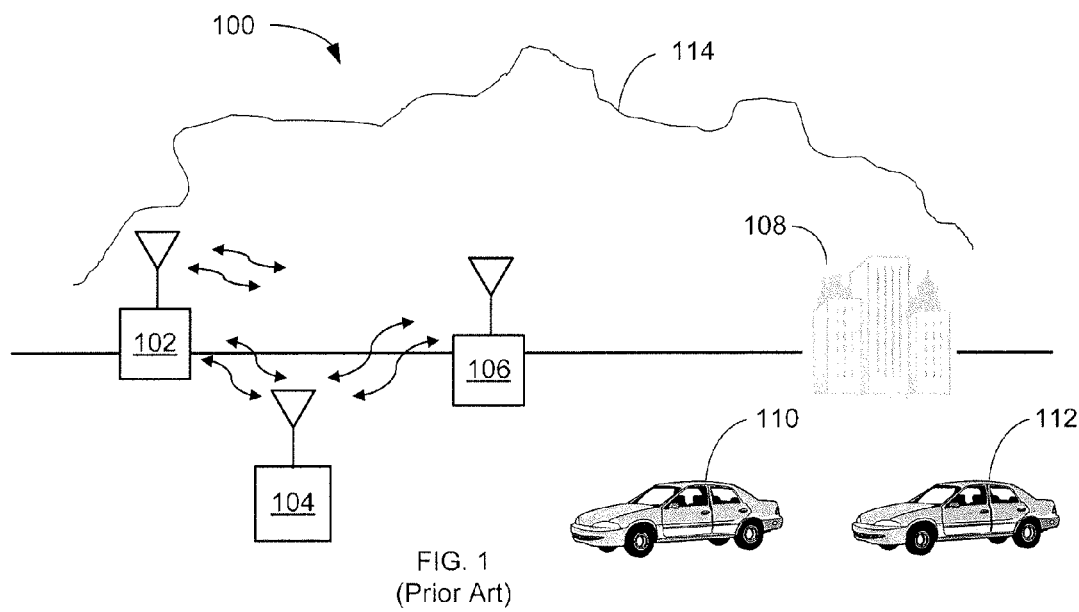
FIG. 1 is a diagram that illustrates an example wireless environment.
Figure 2:
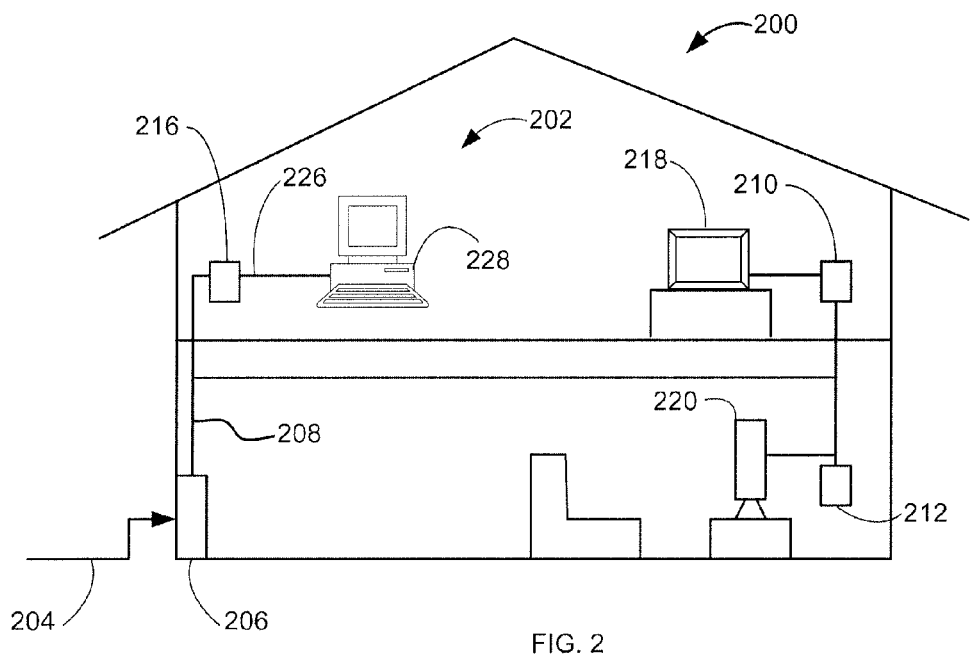
FIG. 2 is a diagram that illustrates an example entertainment network in accordance with the systems and methods described herein.

FIG. 2 is a diagram that illustrates an example entertainment network 202 in accordance with the systems and methods described herein. The entertainment network 202 is located in a typical family home 200. However, it will be understood that the systems and methods described herein can be applied to various other types of buildings or outdoor locations that might use communication networks, such as, but not limited to, the entertainment network 202 illustrated in FIG. 2.

The home 200 is provided with entertainment services through a connection 204 with an entertainment service provider. This connection may be a wired or wireless connection such as cable, satellite, fiber optic, or other communication connection and can include internet service, television programming, etc.

In various embodiments, connection 204 supports the communication of content associated with multiple data services from multiple service providers. For example, a homeowner might use satellite receivers for receiving television content and Digital Subscribers Line (DSL) service to receive internet service. These services might all be connected to a network device 206 that then provides these services to people in the home 200 over a wired home network 208. The wired network might use typical computer network wiring or other types of wiring. For example, the home network 208 might use Ethernet cabling or coaxial cable with a network defined by a communication standard, such as MoCA 1.0. A MoCA or similar network is easy to set up in homes 200 in which adequate coaxial cables have been previously installed.

In various examples, telephone services are provided using connection 204. These services are then routed throughout the home 200 over the wired network 208. Alternatively, these telephone services are connected from the network device 206 to a separate telephone system (not shown) within the home 200. As will be understood by those skilled in the art, many different combinations of services provided using connection 204 and methods of distribution within the home 200 are possible and vary from embodiment to embodiment.

In one embodiment, the network device 206 is a network controller. In such an embodiment, the controller 206 provides control functionality for the network 208. This network 208 is a MoCA network in various embodiments. In the example network 208, internet services and television services are provided through the network 208. As illustrated in FIG. 2, the network 208 is connected to network devices 210, 212 and 216. Network devices 210 and 212 are set top boxes that provide television programming content that can be viewed using the televisions 218 and 220. Network device 216 provides a computer network connection 226 to a personal computer 228. For example, personal computer 228 is connected to the internet using network device 216.

Channel characteristics can be determined for the network 208 by transmitting an EVM probe packet while a second transmitter is transmitting. The EVM is determined for the EVM probe packet. In various embodiments, the network device 216 can also include a wireless component, such as 802.11.80 to which other computers can connect to e.g., over the internet.

Figure 3:
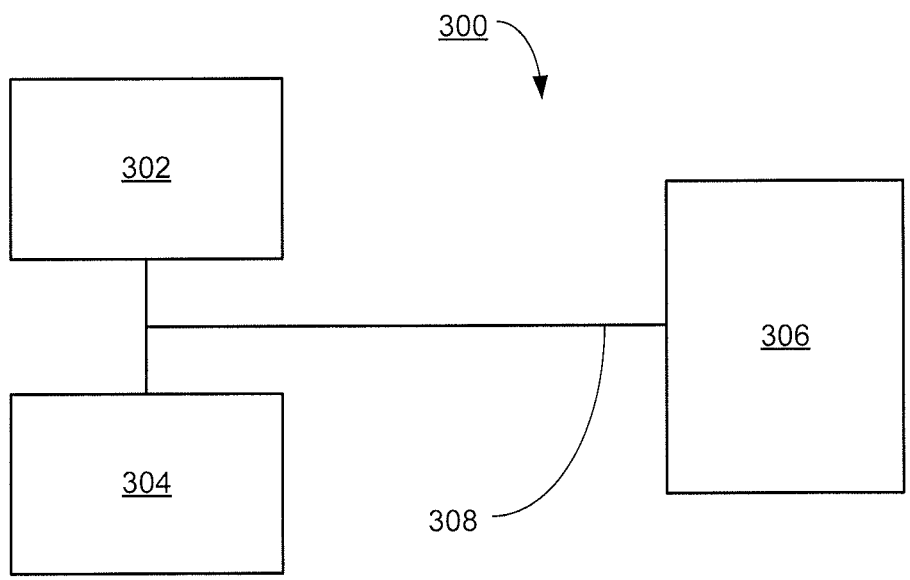
FIG. 3 is a block diagram that illustrates an example wired communication network in accordance with the systems and methods described herein.

FIG. 3 is a block diagram that illustrates an example wired communication network in accordance with the systems and methods described herein. In FIG. 3, a communications network, such as entertainment network 300, includes network devices 302, 304, and 306. One or more network devices 306 can be a network controller 306. The network controller controls various aspects of the network 300.

The network devices 302, 304, and 306 are connected together over a wired connection 308. The channel characteristics of the wired connection 308 generally tend to be consistent, but may change over time due to temperature changes, wiring changes, equipment changes and other factors.

Figure 4:
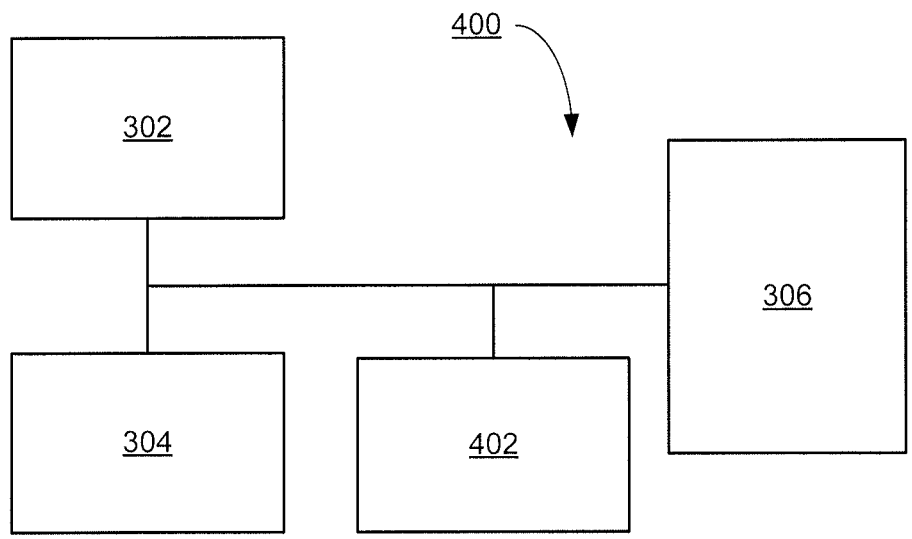
FIG. 4 is another block diagram that illustrates an example wired communication network in accordance with the systems and methods described herein.

FIG. 4 is a block diagram that illustrates an example wired communications network in accordance with the systems and methods described herein. In FIG. 4, the entertainment network 400 includes an additional network device 402. FIG. 4 illustrates that the entertainment network 300 of FIG. 3 may be modified with one or more additional network devices 402. Because these changes may be infrequent, the network characteristics are relatively consistent over time. Accordingly, communication channel probing is preformed infrequently in various embodiments.

As illustrated in FIGS. 3 and 4 the entertainment networks 300 and 400 are wired networks. Because of this, each of the devices 302, 304, 306 and 402 affects other devices in networks 300 and 400. When estimating channel characteristics these effects should be accounted for by placing each network device 302, 304, 306 and 402 in the same mode or configuration it will be in when the network is transmitting data packets (e.g., providing users with entertainment content). In various embodiments, this is done by transmitting communication probes from one device 302, 304, 306, or 402 while one or more additional devices 302, 304, 306, or 402 are transmitting.

Figure 5:
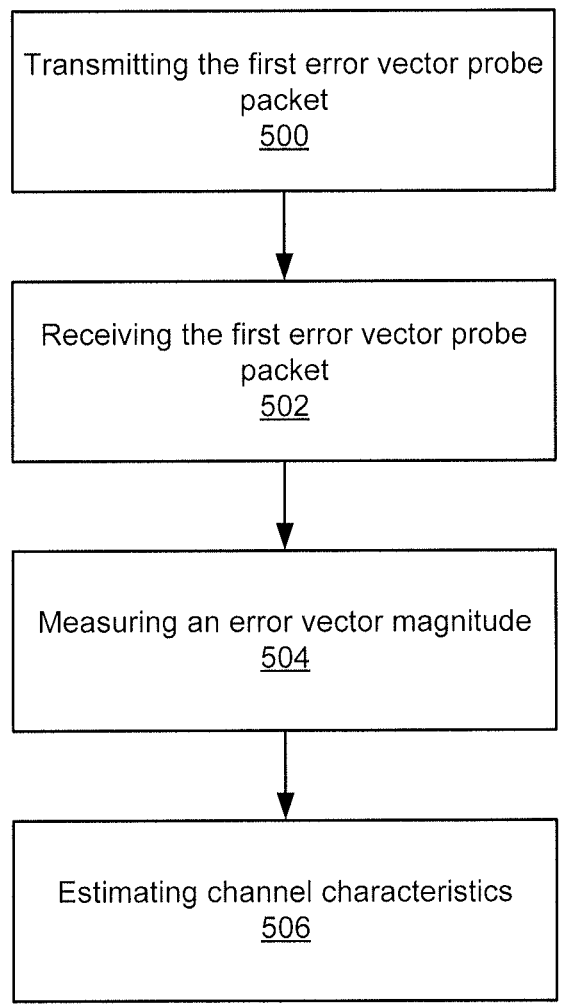
FIG. 5 is a flow chart illustrating an example method in accordance with the systems and methods described herein.

FIG. 5 is a flow chart illustrating an example method in accordance with the systems and methods described herein. In step 500, a device transmits a first EVM probe packet. For example, device 302 transmits the first EVM probe packet. While device 302 is transmitting the packet, the other devices 304, 306, and 402 are also transmitting. In one embodiment, devices 304, 306, and 402 transmit an "analog zero" signal. The analog zero signal is created by transmitting when a logical zero is input to a digital-to-analog converter that drives a transmitter in the devices 304, 306, and 402.

In step 502, a device receives the vector probe packet. In various embodiments, a network controller, another network device, or a receiver within the transmitting device receives the vector probe packet. In one such embodiment, the processing of steps 504 and 506 occurs in one or more network devices, in a network controller, or in the device that transmitted an EVM probe packet.

In step 504, a device measures the EVM for a transmitter based on the received EVM probe packet. The EVM for the transmitter may be the same or similar to the EVM of the network when it is functioning to provide entertainment content to various areas of, e.g., the home, because all or some of the other devices in the network have the same or similar impedance. It should be noted that the impedance of a device can change depending upon whether the device is transmitting and the particular power level of the transmission.

In step 506, a device estimates channel characteristics based on the EVM. The channel characteristics that are estimated based on the EVM can comprise data capacity or signal-to-noise ratio. In various embodiments, steps 502, 504 and 506 occur in a network controller, network device or the transmitting device.

It will be understood by those skilled in the art that the methods disclosed herein easily lend themselves to being programmed into computer readable code which is then stored on a tangible computer readable storage medium, such as a magnetic disk or integrated circuit.

In various embodiments, the method includes determining a power setting based on a previous OFDM or OFDMA EVM determination. It should be understood by those skilled in the art that there are several ways the power setting can be determined. For example, a power setting can be based on power measurements of previously received packets that may or may not include an EVM probe packet. The receiver communicates to the transmitter the level to use. Alternatively, an assumption is made that the channel is reciprocal (i.e., that the characteristics of the channel are the same in each direction) and the transmitter then uses power measurements made on the channel the transmitter is receiving.

Figure 6:
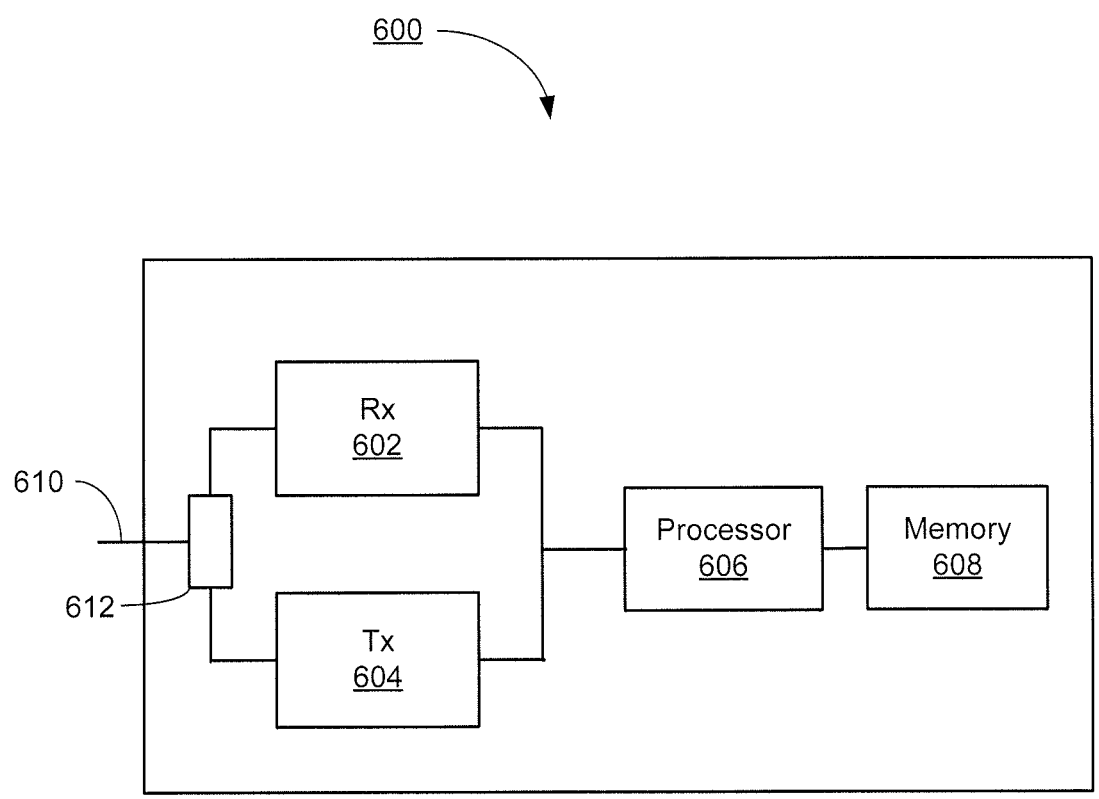
FIG. 6 is a block diagram illustrating an example network device in accordance with the systems and methods described herein.

FIG. 6 is a diagram illustrating a simplified block diagram of an example network device in accordance with the systems and methods described herein. In FIG. 6 the example network device 600 includes receiver circuitry 602 and transmitter circuitry 604. The receiver and transmitter circuitry 602 and 604 are coupled to a processor 606. In various embodiments, the processor 606 is a microprocessor, microcontroller, describe logic, programmable logic, ASIC, FPGA, etc. In other embodiments, the processor 606 is a combination of these. The processor 606 is coupled to a memory 608. In one embodiment, the memory 608 stores instructions, data, or both. For example, instructions implementing the methods described herein can be stored in the memory 608, such as a tangible computer readable storage medium.

As illustrated in FIG. 6, the receiving circuitry 602 and the transmitter circuitry 604 are connected to wired network 610 through a receiver/transmitter filter 612. It will be understood by those of skill in the art that other network devices that may be used to implement the systems and methods described herein may have a separate receiver circuitry 602 input and a separate transmitter circuitry 608 output.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Furthermore, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of probing a wired communication channel comprising:
   a) receiving in the wired communication channel an error vector probe packet that was transmitted by a first transmitter while a second transmitter in a system is transmitting on the wired communication channel using a transmit configuration such that a first impedance of the second transmitter when the first transmitter is transmitting the error vector probe packet and the second transmitter is transmitting a non-user data signal is the same as a second impedance of the second transmitter when the first transmitter and the second transmitter are transmitting user data signals;
   b) measuring an error vector magnitude for the transmitter based on the received first error vector probe packet; and
   c) estimating channel characteristics based on the error vector magnitude.

2. The method of claim 1, wherein the channel characteristic that is estimated based on the error vector magnitude comprises a signal-to-noise ratio.

3. The method of claim 1, wherein the channel characteristic that is estimated based on the error vector magnitude comprises a data capacity.

4. The method of claim 1, wherein the first transmitter transmits a probe packet, while more than one additional transmitter is active and transmitting.

5. The method of claim 1, further comprising:
   a) receiving a second error vector probe packet that has been transmitted from the second transmitter, while the first transmitter is active and transmitting on the wired communication channel;
   b) measuring a second error vector magnitude for the second transmitter based on the received second error vector probe packet; and
   c) estimating channel characteristics for the second transmitter based on the second error vector magnitude.

6. The method of claim 1, further comprising determining a power setting for the first transmitter based on a previous error vector magnitude determination.

7. The method of claim 1, wherein the probe packet is transmitted while the second transmitter is active and transmitting an analog zero signal.

8. The method of claim 1, wherein the estimation occurs at a network controller.

9. The method of claim 1, further comprising:
   d) measuring a plurality of channel power measurements; and
   e) transmitting the plurality of power measurements to the first transmitter.

10. A wired communication system comprising:
    a) a first transmitter configured to transmit an error vector probe packet on a wired communication channel while a second transmitter in the system is active and transmitting on the wired communication channel using a transmit configuration such that a first impedance of the second transmitter when the first transmitter is transmitting the error vector probe packet and the second transmitter is transmitting a non-user data signal is the same as a second impedance of the second transmitter when the first transmitter and the second transmitter are transmitting user data signals;
    b) a receiver configured to receive the error vector probe packet; and
    c) a processor configured to measure an error vector magnitude for the first transmitter based on the received error vector probe packet and to estimate a channel characteristic based on the error vector magnitude.

11. The system of claim 10, wherein the channel characteristic that the processor estimates based on the error vector magnitude comprises a signal-to-noise ratio.

12. The system of claim 10, wherein the channel characteristic that the processor estimates based on the error vector magnitude comprises a data capacity.

13. The system of claim 10, wherein the first transmitter is configured to transmit the first error vector probe packet while a plurality of other transmitters are active and transmitting.

14. The system of claim 10, wherein the processor is further configured to determine a power setting for the first transmitter based on a plurality of power measurements of at least one previously received packet.

15. The system of claim 10, wherein the first transmitter is configured to transmit the first error vector probe packet while the second transmitter is active and transmitting an analog zero signal.

16. The system of claim 10, wherein the analog zero signal comprises an orthogonal frequency-division multiplexing symbol for a voltage input that is substantially zero.

17. The system of claim 10, further comprising:
   d) measuring a plurality of channel power measurements; and
   e) transmitting the plurality of power measurements to the first transmitter.

18. A method of probing a wired communication channel comprising:
   a) transmitting on the wired communication channel an error vector probe packet from a first transmitter of a plurality of transmitters, while the plurality of transmitters in a system are active and transmitting on the wired communication channel, wherein a second transmitter of the plurality of transmitters, while transmitting on the wired communication channel when the first error vector probe packet is transmitted, uses a transmit configuration such that a first impedance of the second transmitter when the first transmitter is transmitting the error vector probe packet and the second transmitter is transmitting a non-user data signal is the same as a second impedance of the second transmitter when the first transmitter and the second transmitter are transmitting user data signals;
   b) receiving the error vector probe packet at a network controller;
   c) determining, at the network controller, the error vector magnitude for the first transmitter based on the first received error vector probe packet; and
   d) estimating, at the network controller, channel characteristics based on the received first error vector magnitude.

19. The method of claim 18, further comprising repeating the steps for each of the plurality of transmitters.

20. The method of claim 18, further comprising estimating a signal-to-noise ratio and a data capacity based on the error vector magnitude.

21. A wired communication device comprising:
   a) a receiver configured to receive a control packet that indicates a plurality of transmitters are active and transmitting on a wired communication channel, wherein a second transmitter of the plurality of transmitters, while transmitting on the wired communication channel, uses a transmit configuration such that a first impedance of the second transmitter when the first transmitter is transmitting the error vector probe packet and the second transmitter is transmitting a non-user data signal is the same as a second impedance of the second transmitter when the first transmitter and the second transmitter are transmitting user data signals; and
   b) a first transmitter of the plurality of transmitters configured to transmit an error vector probe packet when indicated by the control packet that the plurality of transmitters are active and transmitting on the wired communication channel.

22. A wired communication device comprising:
   a) a receiver configured to receive an error vector probe packet transmitted on a wired communication channel when a plurality of transmitters in a system are active and transmitting on the wired communication channel, wherein a second transmitter of the plurality of transmitters, while transmitting on the wired communication channel when the first error vector probe packet is transmitted, uses a transmit configuration such that a first impedance of the second transmitter when the first transmitter is transmitting the error vector probe packet and the second transmitter is transmitting a non-user data signal is the same as a second impedance of the second transmitter when the first transmitter and the second transmitter are transmitting user data signals; and
   b) a processor configured to measure an error vector magnitude for a first transmitter based on the received error vector probe packet and to estimate a channel characteristic based on the error vector magnitude.

23. A non-transitory computer readable storage medium upon which instructions are stored for performing the following:
   a) receiving a first error vector probe packet that was transmitted by a first transmitter while a second transmitter in a system is transmitting on the wired communication channel using a transmit configuration such that a first impedance of the second transmitter when the first transmitter is transmitting the error vector probe packet and the second transmitter is transmitting a non-user data signal is the same as a second impedance of the second transmitter when the first transmitter and the second transmitter are transmitting user data signals;
   b) measuring an error vector magnitude for the first transmitter based on the received first error vector probe packet; and
   c) estimating channel characteristics based on the error vector magnitude.

* * * * *